United States Patent [19]

Mitchell

[11] Patent Number: 4,858,977
[45] Date of Patent: Aug. 22, 1989

[54] SELF-ATTACHING LINKING DEVICE

[76] Inventor: Glen E. Mitchell, 6925-B South 151 W. Ave., Sapulpa, Okla. 74066

[21] Appl. No.: 146,410

[22] Filed: Jan. 21, 1988

[51] Int. Cl.⁴ .......................... F16G 15/04; B66C 1/34
[52] U.S. Cl. .................................. 294/82.1; 294/82.11
[58] Field of Search ............... 294/82.1, 82.11, 82.17, 294/82.19, 82.2; 24/230.5 R, 231, 241 R, 241 S, 241 P, 241 PP, 241 PL, 241 PS, 241 SL, 241 SB; 59/93; D8/367; D34/35

[56] References Cited

U.S. PATENT DOCUMENTS

| | | | |
|---|---|---|---|
| D. 33,410 | 10/1900 | Covert | D54/1 |
| D. 152,135 | 12/1948 | Becker | D26/1 |
| D. 157,122 | 2/1950 | Blake et al. | D31/4 |
| 184,709 | 11/1976 | Haines . | |
| D. 281,222 | 11/1985 | Faidide | D8/367 |
| D. 283,673 | 5/1986 | Berg | D8/367 |
| 340,838 | 4/1986 | Walters et al. | 278/96 |
| 345,086 | 7/1986 | Stahl . | |
| 544,483 | 8/1895 | Eckert . | |
| 1,514,772 | 11/1924 | Kinnear . | |
| 3,652,116 | 3/1972 | Pruitt | 294/82.11 |
| 3,912,318 | 10/1975 | Engh | 294/82 R |
| 4,061,388 | 12/1977 | Wilkinson | 294/82 R |
| 4,429,526 | 2/1984 | Rehbein | 294/82.1 |

Primary Examiner—James B. Marbert
Attorney, Agent, or Firm—Robert E. Massa

[57] ABSTRACT

A self-attaching linking device comprises a U-shaped loop member having a first and a second end, each connected respectively to a first and a second end of a base member, and the base member includes means for closing the linking device securably and easily releasably. One embodiment encompasses a flat base member having a central portion adapted to hold swivelably a cooperating hook member or further securing device. The ends of the base member are integral with the loop member. In another embodiment, the flat base member is swivelably attached to the first end of the loop member and releasably cooperating with the second end of the loop member in securably closing the linking device. In still another embodiment of the linking device, the base member comprises a pair of flat plate members, each having a cooperating central portion holding securably a securing device and each having an opening adjacent each end oppositely oriented so that adjacent ends may cooperate to form closures around the arms of the loop members.

26 Claims, 5 Drawing Sheets

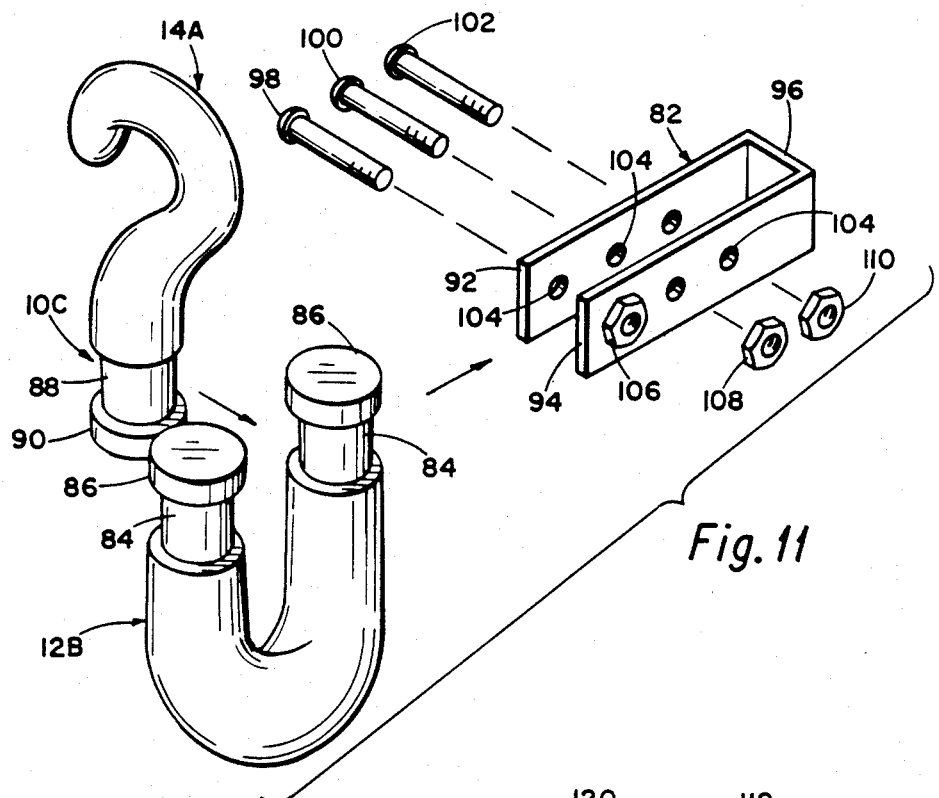
Fig. 11
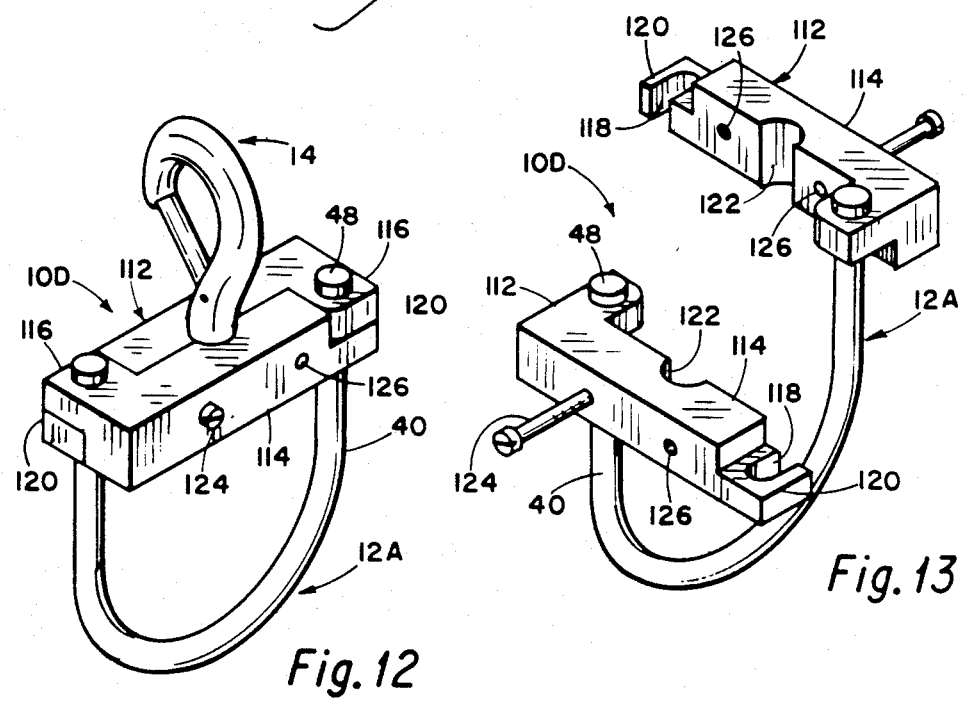
Fig. 12
Fig. 13

SELF-ATTACHING LINKING DEVICE

FIELD OF THE INVENTION

My invention relates to beckets. More particularly, my invention relates to beckets having loop members attachable to base members which in turn include means for closing the beckets securably and easily releasably. Still more particularly, my invention relates to beckets, as for example, self-attaching linking devices, which include swivelably connected securing members attached to base members which are adapted for closing the linking device securably and releasably.

BACKGROUND OF THE INVENTION

Many simple holding devices have been designed throughout history, perhaps starting with a primitive hook fashioned from a bone of some particular animal. Then, probably the art advanced to the preparation of the more intricate tooling devices assembled from chosen bones and seashells to perform particular tooling operations.

Development of the many metals encouraged the design and use of many strong and necessary holding and linking devices, such as chains, snap hooks of many kinds, and various linking devices using swivel components.

I found some of these more sophisticated linking devices while searching the prior art on behalf of my own invention.

Some of these are shown in the following U.S. patents:

| | | |
|---|---|---|
| 184,709 | Haines | Nov. 28, 1876 |
| 340,838 | Walters et al | April 27, 1886 |
| 345,086 | Stahl | July 6, 1886 |
| 544,483 | Eckert | Aug. 13, 1895 |
| D33,410 | Covert | Oct. 23, 1900 |
| 1,514,772 | Kinnear | Nov. 11, 1924 |
| D152,135 | Becker | Dec. 21, 1948 |
| D157,122 | Blake et al | Feb. 7, 1950 |
| 3,912,318 | Engh | Oct. 14, 1975 |
| 4,061,388 | Wilkinson | Dec. 6, 1977 |
| D281,222 | Faidide | Nov. 5, 1985 |
| D283,673 | Berg | May 6, 1986 |

SUMMARY OF THE INVENTION

The primary object of my invention is to provide a linking device which is of simple, unique design, easy to use, and inexpensive.

Another object of my invention is to provide a linking device which is quickly and easily securable and quickly and easily releasable during use.

Still another object of my invention is to provide a linking device which is sturdy and compact.

Still another object of may invention is to provide a linking device which is not liable to become accidently disconnected from an object it is holding secure, and yet which may be quickly and easily purposefully detached from its securing condition.

Still another object of may invention is to provide a linking device which may readily accept and hold securely another linking device.

Still another object of my invention is to provide a linking device which may be easily attachable to a plurality of similar linking devices.

I have been able to devote a great deal of time to the study of many kinds of fastening devices such as snap hooks, beckets, and other hardware and tools employed for fastening, holding, or securing other objects in place. Usually, a fastening device is designed and intended for some particular use or capability. A snap hook, or clevis, might be for a particular purpose as noted in U.S. Pat. Nos. 345,086, 544,483, 1,514,772, or, foro use with joining and holding two or more similar or different lifting devices as explained in U.S. Pat. Nos. 3,912,318 and 4,061,388.

I have described my inventtion as a self-attaching linking device which is capable of receiving, holding, or securingn a chain, cable, or similar restraining apparatus. I have also described my invention as capable of being attachable together in pairs. I have also designed my invention as capable of providing a swivel action for other devices attached thereto.

A brief summary of the most important advantages that I have developed in my linking device is that I have designed a linking device which may be opened or closed easily and quickly, which may be closed securably, and, in performing its linking operation, will provide rotatable action for any cooperating device attached to my linking device. In addition, as I have shown, when any cooperatingn device, or group of cooperating devices, is linkably attached to my linking device, the geometry of my linking device will permit a smooth rotational movement or swivel movement in many directions. My device therefore becomes useful for many linking purposes.

The beckets, clevises, snap hooks, and other linking devices which I have found in my search and through my experience show certain similar characteristics and advantages, all consistent with fundamental features of useful linking devices.

However, I have noticed many disadvantages or limiations which I have overcome with the linking device of my invention. These disadvantages which I have studied in the prior devices include: limited adaptability of some devices, use for only particular purposes, a structure which provides only limited directional flexibility, and designs which provide no increase in usefulness when two of the similar devices are attached to each other.

In my linking device, I have overcome these serious disadvantages. My linking device includes a loop member having a smooth surface which would be in contact with an attached cable, chain, or other restraining apparatus. The loop membe is made accessible to receive such a restraining apparatus by cooperation of an openable portion which may be either an integral portion of the loop member or a separate base member serving as a closure for the loop member by attachment to the two ends of the U-shaped loop member. In either structure, whether the base member is an integral portion of the loop member or is formed from a separate member attached to the loop member, I have provided a central, axially aligned opening adaptable to receive and hold rotatably a cooperating securing device, such as a shaft portion of a snap hook.

I have combined the important features of my linking device in order to offer a convenient linking device which would be adaptable for many purposes at a reasonable cost. Thus, for the person needing linking devices for many different purposes, the same device will serve his requirements.

A smooth, curved surface of the loop member permits smooth, unobstructed movement around the loadbearing portion of the loop member for an attached apparatus; that is, circumferential movement around the loop member as well as swivel movement of the attached apparatus around the loop member in a plane transversely to the plane of the loop member.

I have incorporated these advantages within several forms of my invention. For instance, in one form, I have designed a linking device in which the base member providing the meansn for opening and securing the linking device extends integrally from each end of the loop member and forms the central opening for swivelably holding an attached device. In this model, a hinged portion of the base member is held securably in closed position for quick and easy opening of the linking device.

In another model, as I have shown, I provide the base member as a separate component rotatably attached to one end of the loop member and securable to the other end or leg of the U-shaped loop member to be held securably by a pin. This form provides a central opening therein.

In another form of my invention, I provide a base member formed of two cooperating components, each component swivelably attached to a leg of the loop member, capable of swinging together to form a central opening, and with the cooperating components attachable together by a pin securing them.

I have also provided a form of linking device in which the base member is a separate unit, of U-shaped form, adaptable for attachment to the end of the loop member by pins, or nuts and bolts, and providing sufficient space during attachment for a central opening for attachment of a cooperating snap hook or other chosen device.

In another version of my invention, I have designed the base member to be attachable swivelably to, or, placed swivelably upon, a cooperating snap hook or similar holding device, with each end of the base member attachable to an end of the U-shaped loop member, and again, with the components of the base member easily securable upon the loop member by receiving a pin, threaded bolt, or nut and bolt.

I am also showing one of the many ways in which two or more of my linking devices may be attached, joined, or held together cooperatively for establishing a linking arrangement wherever a particular combination of linking devices is found necessary or advantageous.

In summary, my linking device comprises a loop member having a first end and a second end, and with the loop member being oriented in a first plane; a base member having a first and a second end, each end joining an end of the loop member; the base member having a central opening adapted to receive a cooperating securing device, and with the central opening disposed parallel to the first plane; and the base member including means operable in the direction of a second plane for closing the linking device securably and easily releasably.

The above objects and advantages of my invention will become apparent from my description of the following preferred embodiments of my invention.

BRIEF DESCRIPTION OF THE DRAWINGS

FIG. 11 is an exploded, perspective view of another alternate embodiment of a linking device according to my invention.

FIG. 12 is a perspective view of still another embodiment of a linking device according to my invention showing the linking device in closed position securing a snap hook swivelably.

FIG. 13 is a perspective view of the embodiment of a linking device shown in FIG. 12 describing the base member portion in open position without a snap hook.

DESCRIPTION OF THE PREFERRED EMBODIMENTS

Figure 1:
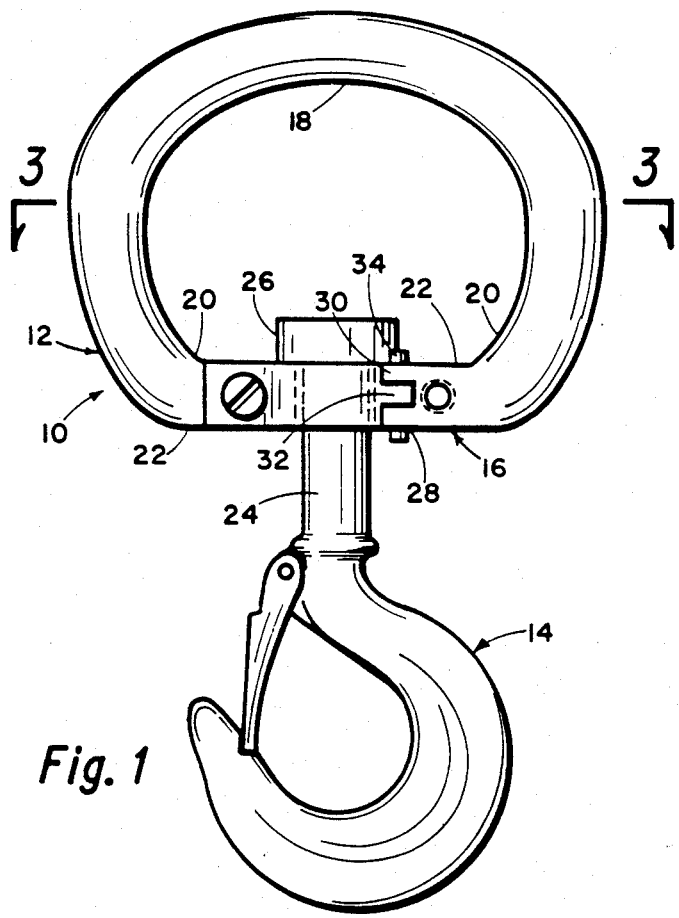
FIG. 1 is a front elevational view of a linking device according to my invention as it is in closed position securing a snap hook.
Figure 2:
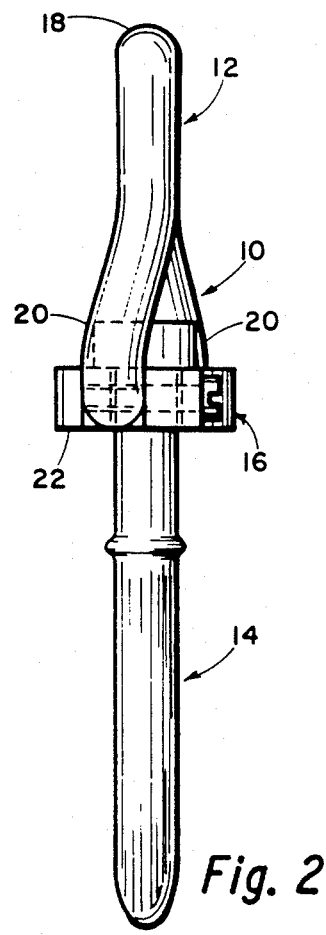
FIG. 2 is a side elevational view of a linking device according to my invention as it appears in FIG. 1.
Figure 3:
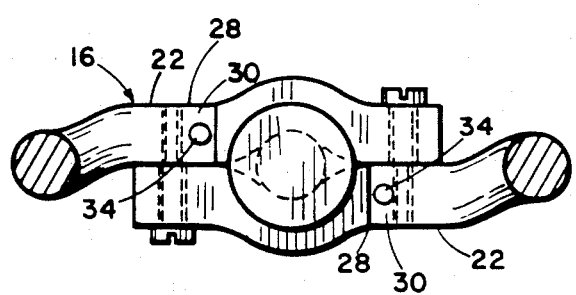
FIG. 3 is a fragmentary, top elevational view, partly in section, along the lines 3—3 of FIG. 1.
Figure 4:
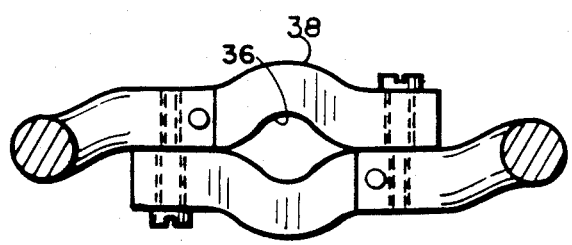
FIG. 4 is a fragmentary, top elevational view, partly in section, of a linking device according to my invention, similar to FIG. 3, but without a snap hook.

FIG. 1 is a front elevational view of a linking device 10, generally, according to my invention as it may appear in a closed position. My linking device 10, generally, comprises a loop member 12, generally, cooperating with, and attached swivelably to, a hook 14, generally, by means of a connecting member, which I prefer to refer to as a base member 16, generally.

Linking device 10 exhibits the advantages I have been seeking in my linking devices. The loop member 12 provides smooth, uninterrupted movement around a curved or U-shaped portion 18, which is preferably of circular cross-section to enhance swivelable movement of a hook, chain, cable, or similar connecting device attached to the loop member 12. Loop member 12 is substantially circular in this embodiment, and the portions of loop member 12 which I designate as a pair of end memberes 20 become integral with end members 22 of base member 16.

I have designed the base member 16 to provide easy and quick access to the loop member 12 for attachment of a cooperating device, to provide smooth rotation for a snap hook 14 attached therein, and to be able to hold the attached snap hook 14 securely.

Linking devices, such as snap hooks, are almost always designed for very limited purposes without sufficient capability for adaptation to the variety of uses the user may encounter.

Thus, for use with a snap hook 14, having a shaft 24 terminating in a flange 26, I may add additional snap hooks or additional linking devices 10, attaching either type of device o the loop member 12 or to the snap hook 14.

The easy and quick opening of my linking device 10 is provided by a pair of hinge members 28 formed adjacent each end member 22 of base member 16 formed by interrlationship of extensions 30 and 32 which are held together by means of pins 34. Base member 16 includes a central opening 36 adapted to receive a cooperating securing device and is disposed parallel to the plane of the loop member 12. Central opening 36 is formed by symmerical curvature of hinge arms 38, suitably leaving enough clearance to permit rotation of shaft 24, or other securing device, as, for example, a spike or bolt which may end in a structure similar to shaft 24 and flange 26. As may be readily seen from viewing FIGS. 1 through 4, the opening and closing action of hinges 28 comprises a movement through a second plane, a plane transverse to the plane in which the loop member 12 lies.

Figure 6:
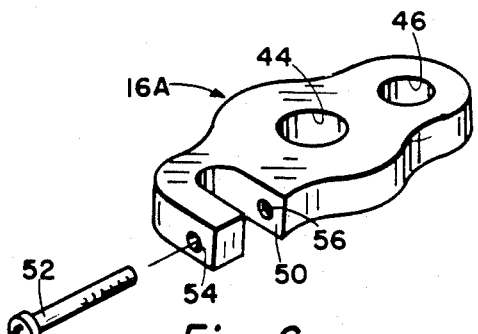
FIG. 6 is a perspective view of a base member component of the embodiment of my linking device shown in FIG. 5 showing the base member in open position.
Figure 5:
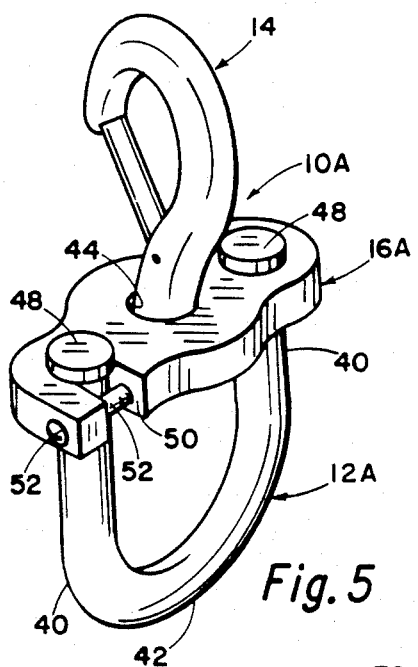
FIG. 5 is a perspective view of an alternate embodiment of a linking device according to my invention as it is in closed position securing a snap hook.

FIGS. 5 and 6 describe an alternate embodiment of my linking device. My linking device 10a, generally, as shown in FIG. 5 comprises a modified form of loop member 12a, generally, cooperating with, and attached swivlably to, a hook 14, generally, by means of a modified form of base member 16a, generally.

Preferably, for this embodiment, I desire that loop member 12a have a pair of arm portions 40 which are straight and parallel in providing a U-shape for loop member 12a in combination with a smooth, curved portion 42 to give free movement around the loop member 12a for a cooperating device attached to loop member 12a.

In this embodiment, I have designed a base member 16a to comprise a flat plate having a central opening 44 to receive a shank portion of a snap hook 14, again with sufficient clearance to permit easy rotation of snap hook 14 as with linking device 10.

In this embodiment I have provided base member 16a with an opening 46 at a first end to receive swivelably a first arm portion of loop member 12a. Then, loop member 12a is retained connectively on base member 16a by means of a flange 48 against the force of any object pulling against loop member 12a. The base member 16a includes a slot opening 50 to receive a second arm portion of loop member 12a for closing the loop member 12a with base member 16a. Then, when the second arm portion moves into opening 50, a threaded bolt 52 moves into position through opening 54 and into a threaded opening 56 to close the opening 50 and secure loop member 12a in place.

The arrangement of base member 16a in cooperation with loop member 12a provides for easy and quick opening of the linking device for ready attachment of a cooperating device where necessary.

Figure 7:
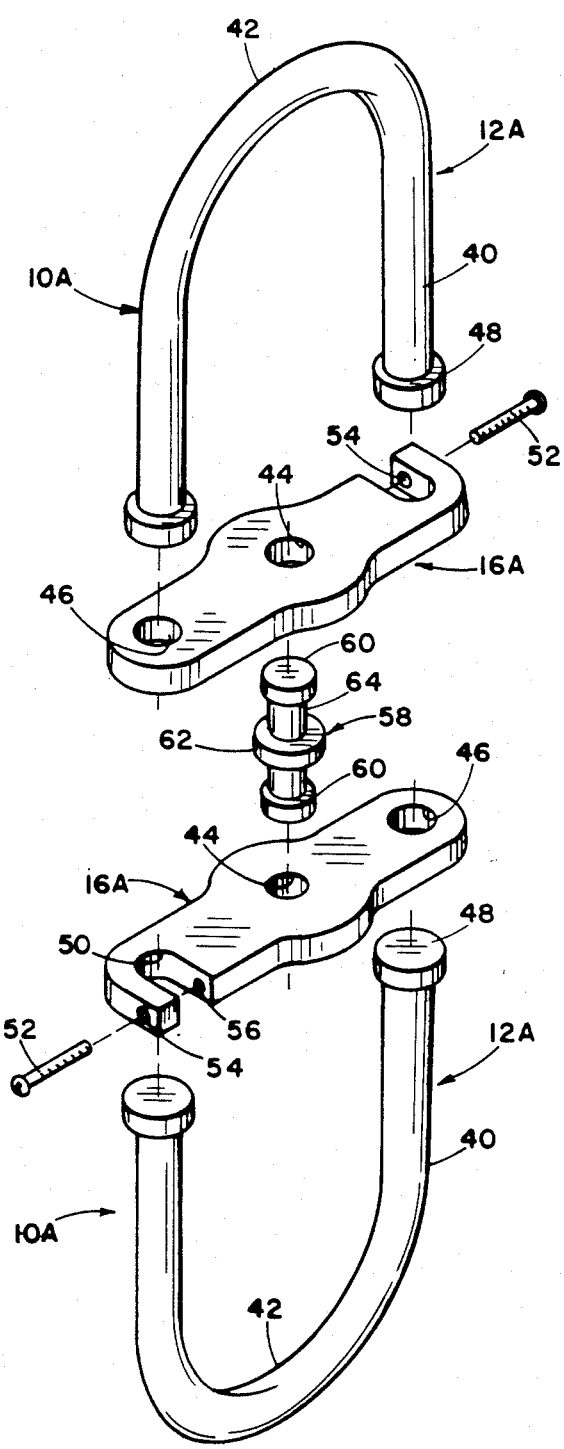
FIG. 7 is an exploded, perspective view of a pair of linking devices according to my invention, similar to the embodiment shown in FIG. 5, showing two linking devices swivelably connected.

FIG. 7 describes a particular unique use I am able to accomplish with my linking device. I have arranged a manner of connecting two of my linking devices swivelably to serve a multiplicity of purposes. In FIG. 7 I show two of my linking devices 10a secured together by swivelable attachment to a swivel member 58, generally, which comprises a series of flanges 60 and 62 formed on a pin 64. Central flange 62 is sufficiently thick to provide clearance for flanges 48 on each of the loop members 12a which are shown in FIG. 5 to extend above base member 16a.

Figure 9:
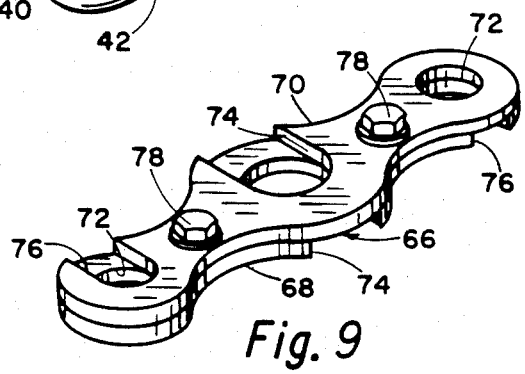
FIG. 9 is a perspective view of a base member component of the linking device embodimentn described in FIG. 8 as it appears in closed position.
Figure 10:
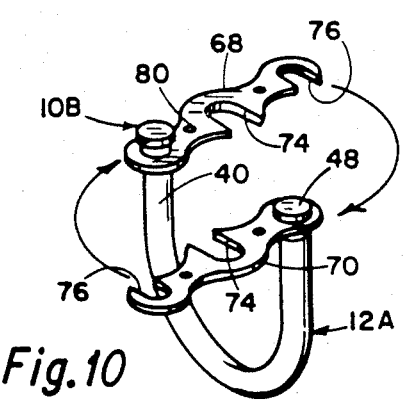
FIG. 10 is a perspective view of the linking device embodiment described in FIG. 8 as it appears in open position without a snap hook.
Figure 8:
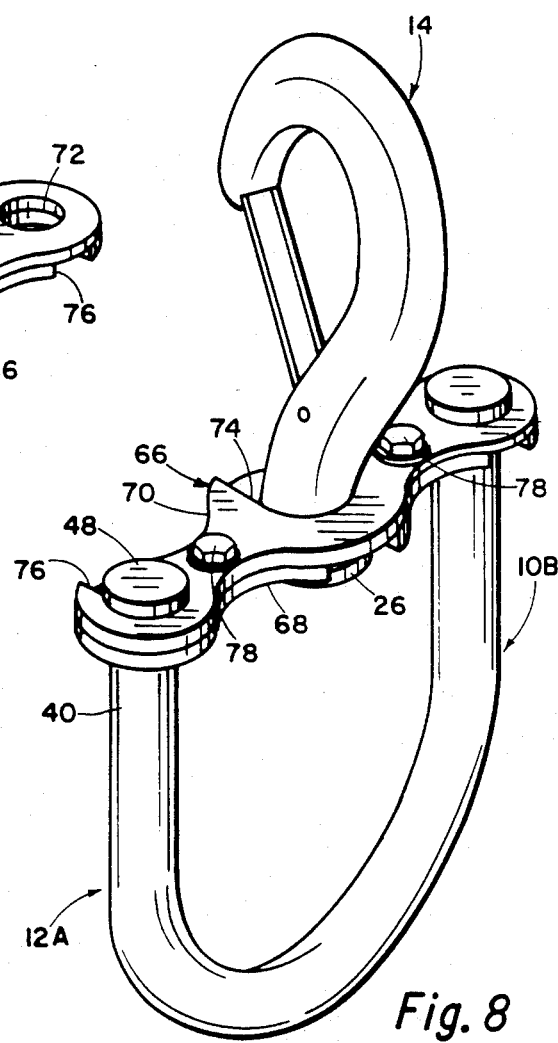
FIG. 8 is a perspective view of another alternate embodiment of a linking device according to my invention as it is in closed position securing a snap hook.

FIGS. 8, 9, and 10 describe another embodiment of my linking device. FIG. 8 shows my modified linking device 10b in closed position. With this modification I have incorporated a snap hook 14 and my previously described loop member 12a with a modified base member 66, generally. Base member 66 comprises a pair of plate members 68 and 70 which, preferably, for ease of manufacture, are identical in structure. Then, in use, as described in FIGS. 8, 9, and 10, are reversed in position. Each plate member 68 or 70 includes an opening 72 adjacent a first end which permits each plate member 68 and 70 tobe swivelably attached to the arms 40 of the loopmember 12a. Each plate member 68 and 70 includes a central slot opening 74 and a slot opening 76 adjacent a second end of each plate member 68 and 70. As I have shown in FIGS. 8, 9, and 10, when thte plat members 68 and 70 are moved toether swivelably to form a closed position of base member 66, slot opening 74 of each plate member 68 and 70 cooperate to form a central opening to accept swivelably hook 14, and each slot opening 76 engages an arm 40 forming a closed position of the base member 66. In the closed position, plate members 68 and 70 are held securely in position by a pair of nut and bolt combinations, such as a bolt 78 passing through hole 80 in each plate member and secured by a nut (not shown) on the opposite side of base member 66. This combination allows quick and easy opening or closing of my linking device 10b for quick attachment or removal of other components.

FIG. 11 describes still another embodiment of my linking device. In this embodiment, my linking device 10c comprises a slightly modified form of loop member 12b, generally, attachable to a slightly modified form of hook 14a, generally, secured together by a separate retaining member as base member 82, generally, in a manner to provide the swivelable movement for my linking device and the easy and quick opening and closing which I have sought for my linking devices.

Loop member 12b includes indented shaft portions 84 capped by flanges 86. Hook member 14a includes an indented shaft portion 88 adjacent the end and a flange 90. Then, when the linking device 10c is placed in a closed position, side plates 92 and 94 of base member 82 fit closely and alignedly along shaft portions 84 and 88 in a manner to permit base member 82 to hold loop member 12b securably and hook 14a swivelably. Base member 82 comprises a U-shape by conformation of slide plates 92 and 94 with end plate 96. To secure base member 82 in position in combination with loop member 12b and hook 14a, a set of pins, or bolts 98, 100, and 102 pass through openings 104 in side plates 92 and 94 and are held secure by nuts 106, 108, and 110, with a first shaft 84 secured between bolts 98 and 100, shaft 88 of hook 14a held swivelably between bolts 100 and 102, and a second shaft 84 held between bolt 102 and end plate 96, all presenting a means for easy and quick opening and closing of the linking device 10c.

FIGS. 12 and 13 describe still another embodiment of my linking device. In these figures, linkingn device 10d comprises loop member 12a and hook 14 which are secured in combination by base member 112, generally, which in its closed position holds hook 14 swivelably attached. Base member 112 comprises a pair of identical plate members 114, each held swivelably open opposite arms 40 of the loop member 12a by means of an opening through flange portions 116. Each plate 114 includes a slot opening 118 in a lower flange portion 120 which receives an arm 40 of the loop member 12a when in the closed position. Each plate member 114 includes a central cylindrical indentation 122 which cooperates with an opposite indentation 122 to form a central opening in the closed position of the base member 112 to receive swivelably therein the shank of loop 14. In the closed position, the two plate members 114 are held together by the action of a bolt 124 inserted through aligned openings 126 and secured on the outside of the opposite plate member by a nut (not shown). Again, the opening and closing of the linking device may be accomplished easily and quickly for the attachmentn or removal of a cooperating component.

Figures 14, 15:
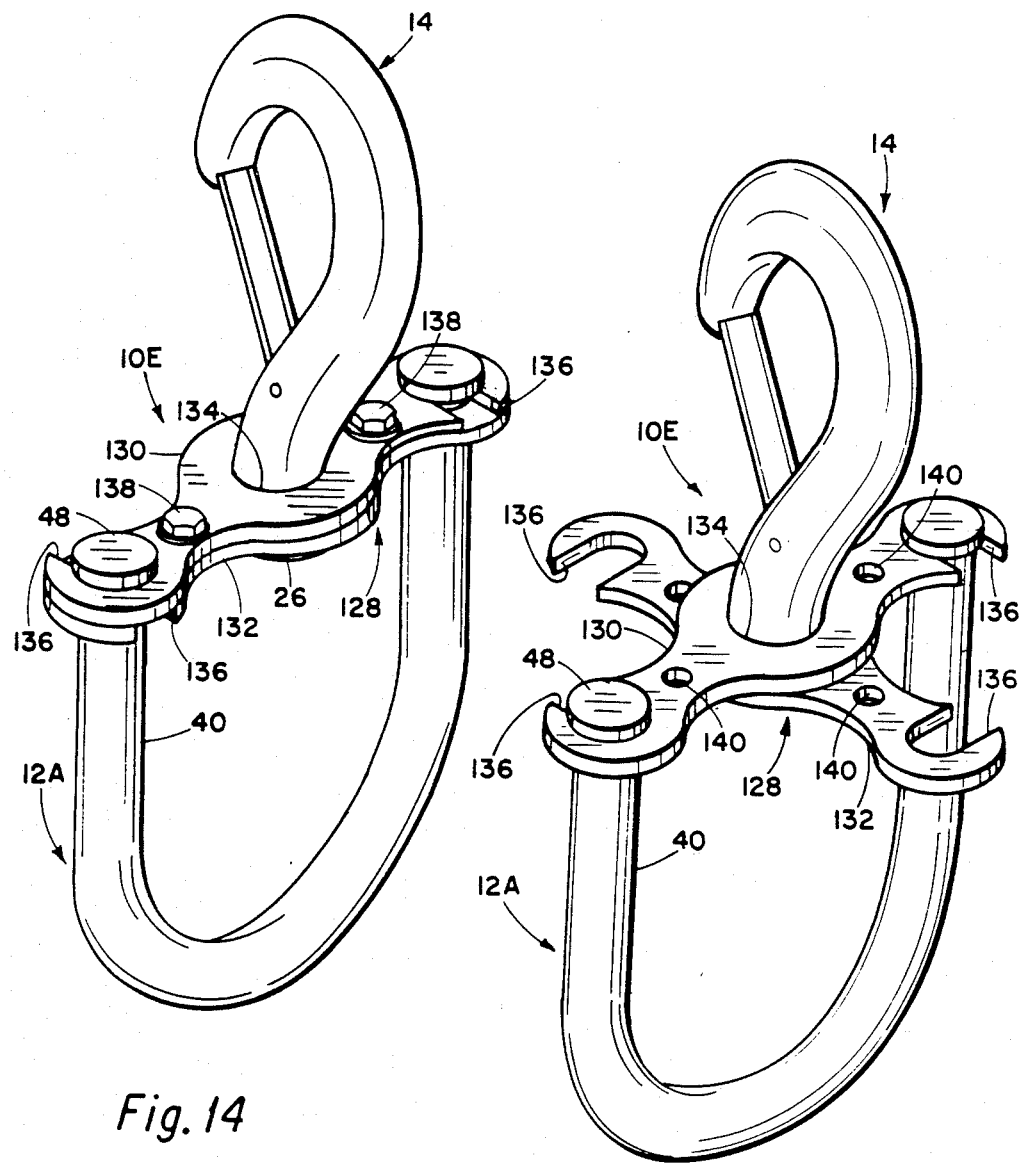
FIG. 14 is a perspective view of still another embodiment of a linking device according to my invention showing the linking device in closed position with a snap hook held swivelably.
FIG. 15 is a perspective view of the embodiment of a linking device shown in FIG. 14 describing the base member in partially open position.

FIGS. 14 and 15 describe still another embodiment of my invention, wherein linking device 10e comprises a loop member 12a attachable to hook 14 by means of a modified base member 128, generally. Base member 128 comprises two plate members 130 and 132 held swivelably upon hook 12 by the positioning of hook 14 through a central opening 134 through each plate member 130 and 132 adjacent flange 26. Each plate member 130 and 132 may be identical in conformation, but, as showon, oriented oppositely so that slot openings 136 my cooperate to form closures around each arm 40 of the loop member 12a. Then, in the closed position, the plate members 130 and 132 are held securely together by action of bolt members 138 passing through openings 140 and held by nuts (not shown) on the outside of the opposite plate member. This arrangement also provides for easy and quick attachment and removal of the base member.

Since many different embodiments of this invention may be made without departing from the spirit and scope thereof, it is to be understood that the specific embodiments described in detail herein are not to be taken in a limiting sense, since the scope of the invention is best defined by the appended claims.

I claim:

1. A self-attaching linking device, comprising:
a loop member having a first end and a second end, the loop member being oriented in a first plane,
a base member having a first end and a second end, each end joining an end of the loop member,
the base member having a central opening adapted to receive and hold rotatably a cooperating securing device, the central opening axially aligned and disposed parallel to the first plane, and
the base member including means operable in a second plane for closing the linking device securably and easily releasably.

2. A self-attaching linking device as described in claim 1, wherein
the ends of the base member are integral with theends of the loop member.

3. A self-attaching linking device as described in claim 1, wherein
the loop member includes a first arm portion includingn the first end, and a second arm portionn including the second end.

4. A self-attaching linking device as described in claim 3, wherein
the first arm portion has a flange adjacent the first end and is adapted to cooperate swivelably with the first end of the base member, and
the second arm portion has a flange adjacent the second end cooperating with the means for closing the linking device securably and easily releasably.

5. A self-attaching linking device as described in claim 4, wherein
the base member comprises a flat plate.

6. A self-attaching linking device as described in claim 5, wherein
the base member includes a central portion adapted to hold swivelably a portion of a cooperating securing device.

7. A self-attaching linking device as described in claim 6, wherein
the means for closing the linking device securably and easily releasably includes an opening adjacent the second end of the base member, and
the base member is adapted to receive a bolt to close the opening.

8. A self-attaching linking device as described in claim 7, wherein
the linking device includes a second base member swivelably attached to the base member,
a second loop member joining the second base member, and
the second base member having means for closing the second loop member securably and releasably.

9. A self-attaching linking device as described in claim 8, wherein
the second loop member has a first and a second end,
the second base member has a first and a second end with each end joining a respective end of the second loop member.

10. A self-attaching linking device as described in claim 9, wherein
the second loop member includes a first arm portion including the first end and a second arm portion including the second end.

11. A self-attaching linking device as described in claim 10, wherein
the first arm portion of the second loop member has a flange adjacent the first end and is adapted to cooperate swivelably with the first end of the second base member, and
the second end portion of the second loop member has a flange adjacent the second end cooperating with the means for closing the second loop member securably and releasably.

12. A self-attaching linking device as described in claim 11, wherein
the second base member comprises a flat plate member including a central portion adapted to hold a swivel member connecting the first and second base members swivelably.

13. A self-attaching linking device as described in claim 12, wherein
the means for closing the second loop member securably and releasably includes an opening adjacent the second end of the second base member, and
the second base member is adapted to receive a bolt to close the opening.

14. A self-attaching linking device as described in claim 5, wherein
the base member comprises a first and a second plate member,
a first end of the first plate member attached swivelably to the first arm portion of the loop member, the first plate member having an opening adjacent a second end thereof to receive the second arm portion of the loop member, and a first end of the second plate member attached swivelably to the second arm portion of the loop member, the second platte member having an opening adjacent a second end thereof to receive the first arm portion of the loop emmber.

15. A self-attaching linking device as described in claim 14, wherein the base member includes a central portion adapted to hold swivelably a portion of a cooperating securing device.

16. A self-attaching linking device as described in claim 15, wherein the means for closing the linking device securably and easily releasably includes means for securing the pair of plate members together.

17. A self-attaching linking device as described in claim 16, wherein the means for securing the pair of plate members together includes a threaded member passing through the firstt plate member and at least entering the second plate member.

18. A self-attaching linking device as described in claim 3, wherein the base member comprises a separate retaining member securable to the loop member.

19. A self-attaching linking device as described in claim 18, wherein the first arm portion has a flange adjacent the first end and is adapted to cooperate swivelably with the first end of the base member, and the second arm portion has a flange adjacent the second end cooperating with the means for closing the linking device securably and easily releasably.

20. A self-attaching linking device as described in claim 18, wherein the retaining member comprises a U-shaped member held in place by cooperating nuts and bolts.

21. A self-attaching linking device as described in claim 3, wherein the base member includes a central portion adapted to hold swivelably a portion of a cooperating securing device.

22. A self-attaching linking device as described in claim 21, wherein the base member comprises a pair of plate members, each plate member having a central portion cooperating to comprise the central portion adapted to hold securably a portion of a cooperating securing device, each plate member having an opening adjacent each end thereof to receive an arm of the loop member, and the plate members oppositely oriented in order that the openings adjacent nearby ends of the plate members may cooperate to form closures.

23. A self-attaching linking device as described in claim 22, wherein the means for closing the linking device securably and easily releasably includes means for securing the plate members together.

24. A self-attaching linking device as described in claim 23, wherein the means for securing the plate members together includes a threaded member.

25. A self-attaching linking device, comprising:

a loop member having a first end and a second end, the loop member being oriented in a first plane, a base member having a first end and a second end, wherein the ends of the base member are integral with the ends of the loop member, the base member having a central opening adapted to receive a cooperating securing device, the central opening disposed parallel to the first plane, and the base member including means operable in a second plane for closing the linking device securably and easily releasably with the means for closing further including a hinged portion adjacent an end of the base member adapted to close the linking device.

26. A self-attaching linking device as described in Claim 25, wherein the means for closing the linking device securably and easily releasably includes a central portion adapted to hold swivelably a portion of a cooperating securing device.

* * * * *